United States Patent [19]
Feliz

[11] 3,783,960
[45] Jan. 8, 1974

[54] TRAILER MANEUVERING JACK

[76] Inventor: Jack M. Feliz, 34-808 Via Echo, Palm Springs, Calif. 92262

[22] Filed: Jan. 10, 1972

[21] Appl. No.: 216,653

[52] U.S. Cl................ 180/14 A, 180/13, 180/65 R, 254/86 R, 280/3, 280/43.2, 280/475
[51] Int. Cl. ............................................ B60s 9/16
[58] Field of Search ............... 180/11, 12, 13, 19 S, 180/79.1; 280/3, 150 A, 150.5, 406 A, 475, 43.2; 254/86 R, 86 H, DIG. 2

[56] References Cited
UNITED STATES PATENTS

| | | | |
|---|---|---|---|
| 3,458,173 | 7/1969 | Kornovich et al. | 254/86 R |
| 2,036,153 | 3/1936 | Lewis | 280/3 X |
| 2,356,172 | 12/1967 | Peckham et al. | 180/19 S |
| 3,288,435 | 11/1966 | Starkey | 254/86 R |
| 2,439,764 | 4/1969 | Kimball | 180/12 |
| 3,566,986 | 3/1971 | Udden | 180/79.1 X |
| 3,648,539 | 3/1972 | Rouis | 180/79.1 X |

FOREIGN PATENTS OR APPLICATIONS 896,592  5/1944  France................................ 280/475

*Primary Examiner*—Kenneth H. Betts
*Assistant Examiner*—Leslie J. Paperner
*Attorney*—Harris, Kern, Wallen & Tinsley

[57] ABSTRACT

A self-contained conveyance or maneuvering device for mounting to the tongue platform of a trailer or the like which has a jack column and a ground-engaging wheel at the lower end thereof which can be vertically raised or lowered by power. The jack column is also rotatably power driven in either direction so as to direction orient the wheel. The wheel is reversibly power driven to move the platform and trailer. The vertical and rotational movement of the jack is accomplished by a single drive source which drives a transmission which in turn is connected, respectively, to the drives for vertically translating the jack column, and for rotating it. The directions of movement and power applications are determined by a control circuit and control switches, the switches for controlling wheel direction and wheel reversible rotation being located in a hand control unit at the end of a length of electrical cable.

4 Claims, 9 Drawing Figures

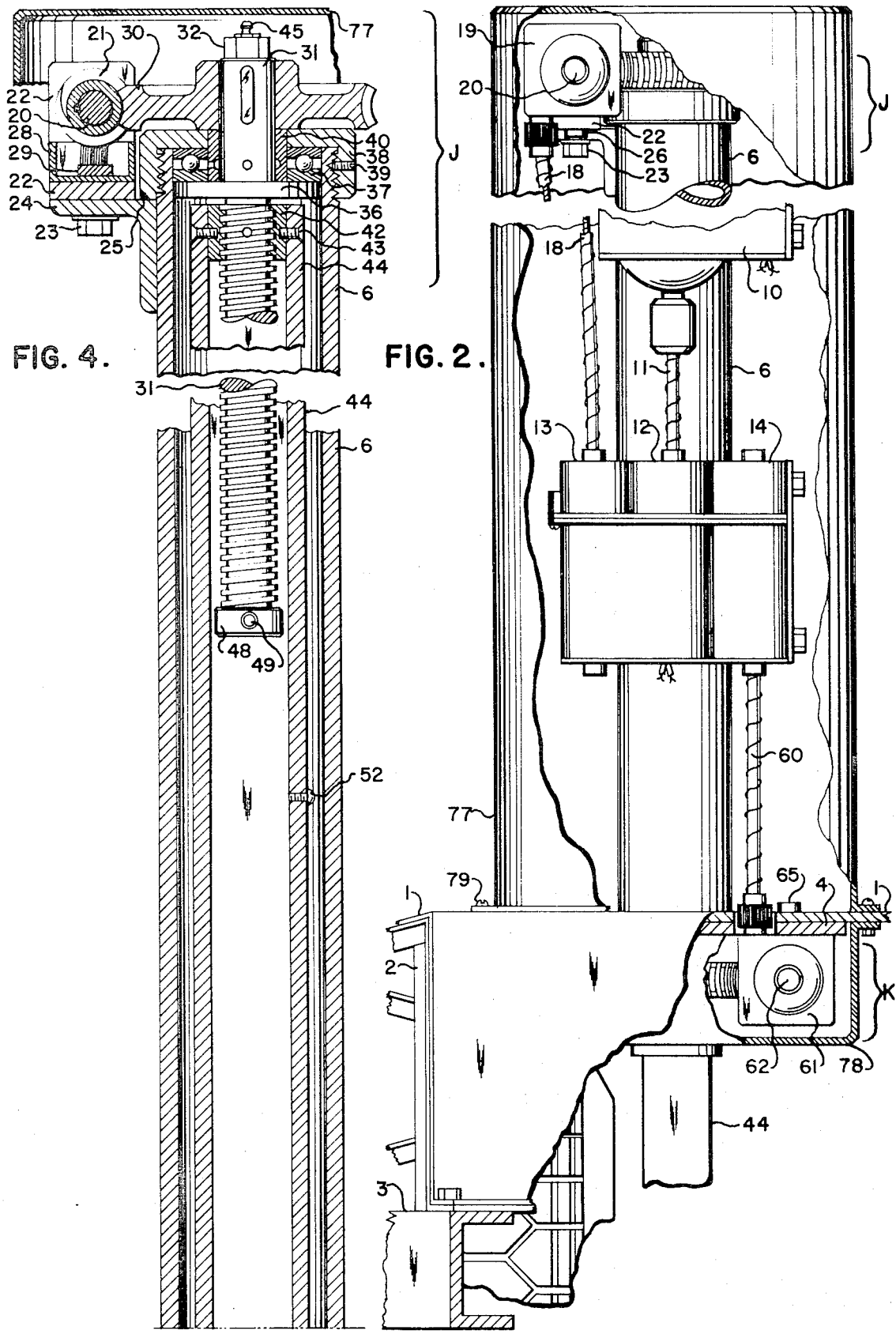

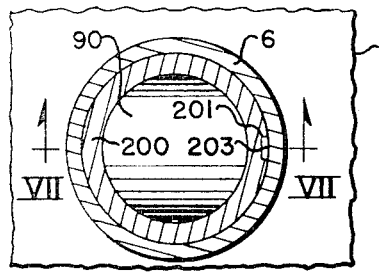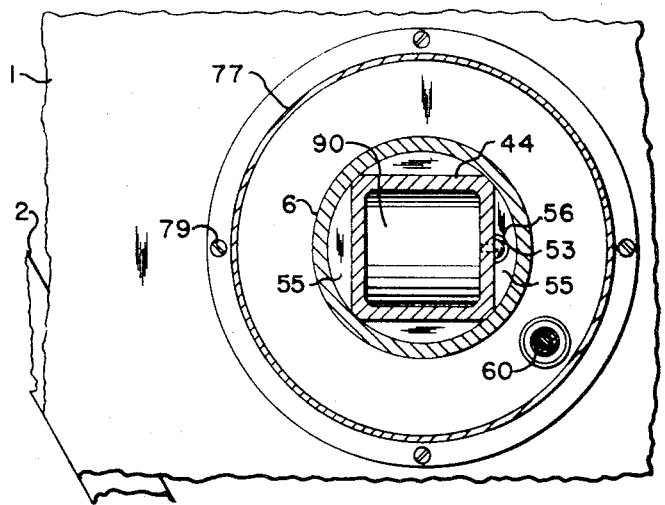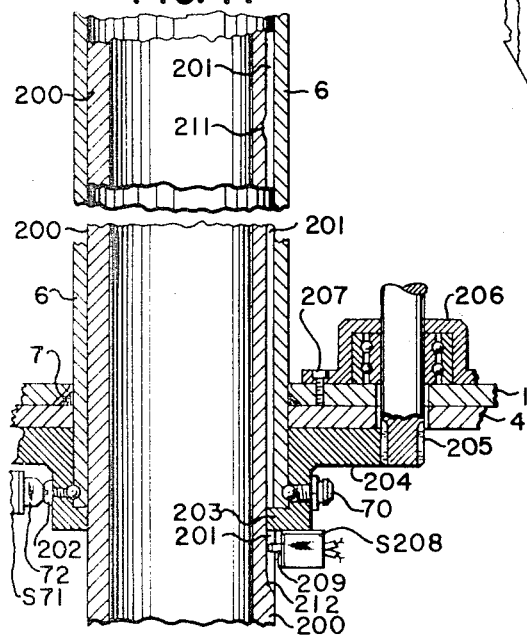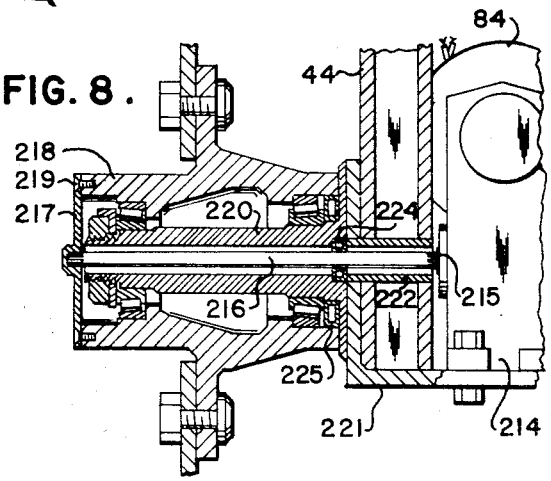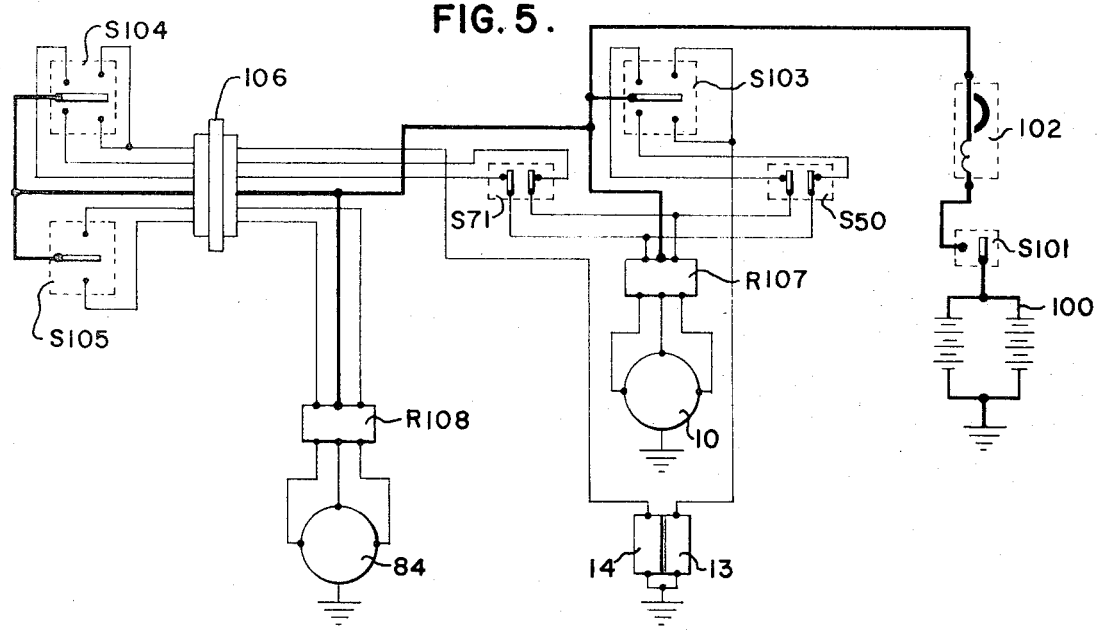

TRAILER MANEUVERING JACK

BACKGROUND OF INVENTION

This invention relates to a conveyance intended primarily for persons encountering difficulty in backing a tow vehicle into the proper position for hooking up a trailer, backing the trailer into a confined parking space, or turning the trailer around on a narrow dead end street.

The chief aim of the present invention is to provide a self-contained conveyance which will enable the operator to maneuver the trailer by remote control, without the aid of the tow vehicle, in order to cope more easily with the above mentioned discomforting problems.

In known types of portable power dollies used for parking trailers and mobile homes, they are, in the main, not entirely satisfactory due to their inherent encumbrance in connecting, disconnecting and stowage. Further, they are steered by hand levers at the front of the trailer which will necessarily restrict the operator's view directly to the rear of the trailer.

SUMMARY AND OBJECTS OF INVENTION

A general object of the present invention is to provide an improved trailer maneuvering device which is self-contained and having novel features of construction and design. Another object is to provide a trailer maneuvering device which is integral with the trailer frame, mounted within the tongue channel bars, thereby permitting retraction of the drive wheel assembly for road travel. A further object is to provide an improved steering device that permits the operator a choice of local or remote control of power steering.

More particularly, it is the object of the present invention to provide an extension cord with suitable switches to remotely control the drive wheel motor and the steering motor permitting the operator an unrestricted view of any direction in which the trailer may be maneuvered, either forward or rearward as well as making turns in one direction or the other. Another object is to provide a power jack means for raising or lowering the trailer tongue for purposes of hitching, unhitching and leveling the trailer longitudinally, which is incidental to retracting or extending the drive wheel assembly.

Another object is to use one motor connected to suitable gearing and electrical instrumentalities to provide power means to actuate the jack and steering assemblies in order to reduce the weight and cost. Still a further object of the invention is to provide a hand crank means to raise and lower the tongue for hitching to the tow vehicle in the event of power failure. Another object is to provide a device which is easily operable with a minimum amount of physical exertion on the part of the operator; and which, moreover, is light in weight, relatively simple in construction and sturdy against easy derangement over long periods of use.

The foregoing objects, advantages, features and results of the present invention, together with various other objects, advantages, features and results thereof which will be evident to those skilled in the art to which the invention relates in the light of this disclosure, may be achieved with the exemplary embodiments of the invention illustrated in the accompanying drawings and described in detail hereafter.

DESCRIPTION OF DRAWINGS

FIG. 2 is an enlarged front elevational view of the device, partly in section, taken as indicated along the angled arrows II—II of FIG. 1;

FIG. 3 is an enlarged fragmentary plan view, partly in section, taken as indicated along the angled arrows III—III of FIG. 1, illustrating the extendable square tubed jack column rotatably mounted within the stationary circular jack column;

FIGS. 4 and 4a, taken together, constitute an enlarged vertical cross section taken as indicated along the angled arrows IV—IV of FIG. 1, illustrating details of the jack and steering assemblies and a portion of the wheel drive assembly;

FIG. 5 is an electrical circuit wiring diagram of various electrical components required for effecting and controlling the operation of the conveyance by power;

FIG. 6 is a view corresponding to FIG. 3, showing a modified circular jack column, rotatably mounted within the stationary jack column;

FIG. 7 is a fragmentary view in section taken as indicated along the angled arrows VII—VII of FIG. 6, illustrating modified details of the extendable circular jack column and steering assembly; and FIG. 8 is a view corresponding to a portion of FIG. 4a showing a wheel drive modification to the invention.

DESCRIPTION OF EXEMPLARY EMBODIMENTS OF THE INVENTION

Figure 1:
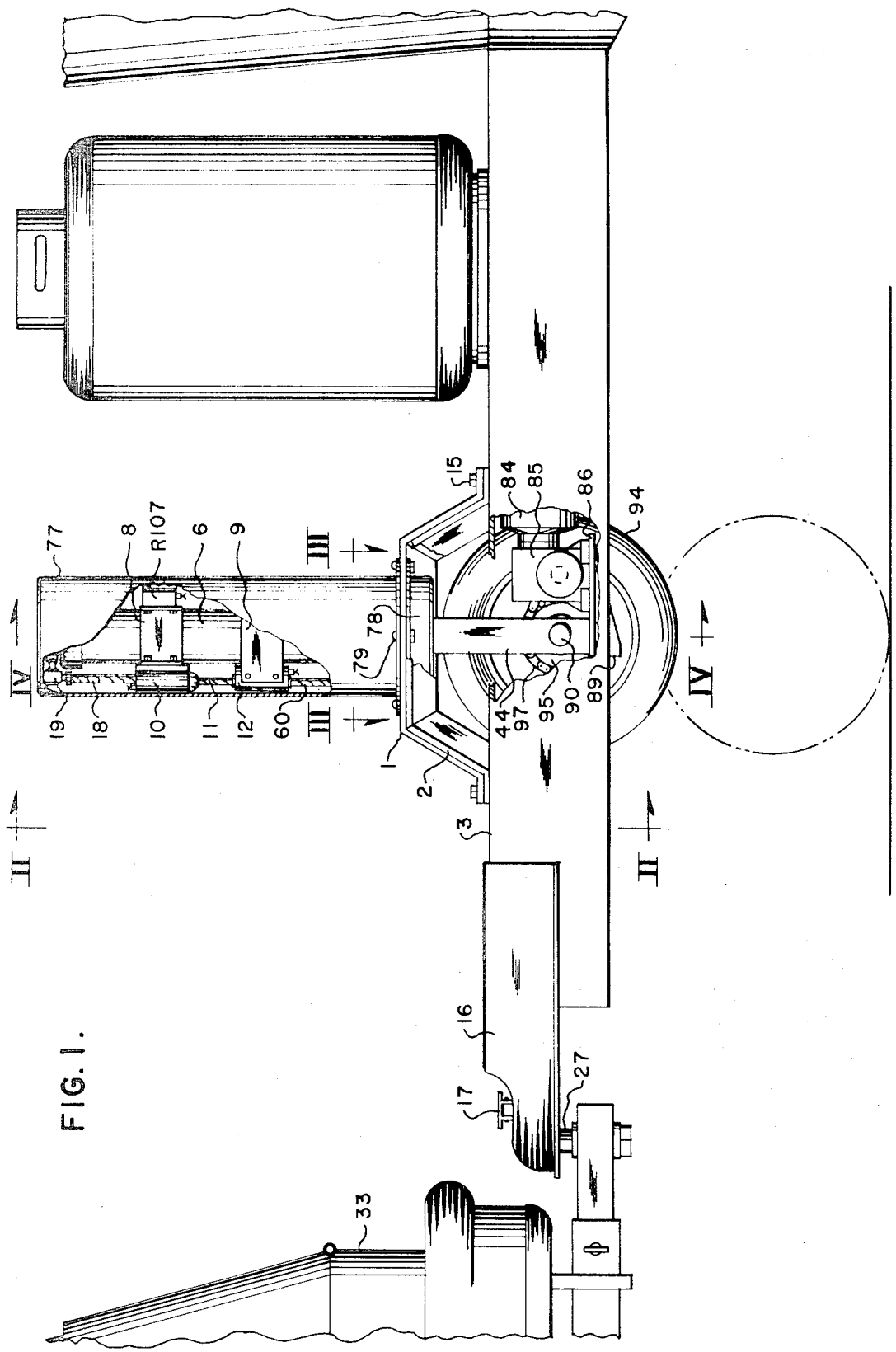
FIG. 1 is a side elevational view, partially in section, of the device of the present invention secured to the tongue of a trailer, which in turn is hitched to a tow vehicle.

Referring to FIG. 1 of the drawings, the conveyance of the invention comprises a platform 1, which is trapezoidal in plan and secured to a frame 2, constructed of angle bars which in turn are secured to the trailer tongue channel bars 3 as by bolts 15. A jack supporting flange 4 (see FIG. 4a) is mounted as by bolts 5 to the platform 1. The flange 4 is further secured at 7 to a stationary jack column 6. A jack and steering reversible electric motor 10 (FIGS. 1 and 2) is supported by a detachable clamp 8 secured to the jack column 6. The motor 10 drives a flexible shaft 11, which in turn drives a transmission 12, supported by a detachable clamp 9 secured to the column 6. The transmission 12 comprises drive sections 13 and 14 and are selectively engaged by solenoid-actuated clutches which are embodied in their respective sections. A description of the various control functions will be provided later with reference to the wiring diagram shown in FIG. 5.

Drive sections 13 and 14 are connected respectively to flexible shafts 18 and 60, which in turn are connected to gear reducers 19 and 61 respectively.

JACK ASSEMBLY

Referring now to the jack assembly J, it is best seen in FIG. 2 and includes the transmission drive section 13, which drives the flexible shaft 18, which in turn drives the gear reducer 19 which is secured to a bracket 22 as by screws 26. The gear reducer 19 drives a worm shaft 20 which is keyed to a worm 21 (FIG. 4) and is suitably journaled in bearings supported by the bracket 22, which is secured as by bolts 23 to an angled bracket 24, which is secured at 25 to a thrust cap 38. A lubricant holding pan 28 and brush 29 are secured within the bracket 22. The worm 21 meshes with a worm gear 30 and has its hub keyed to a vertical jack screw shaft 31. As will be hereinafter understood, the jack screw shaft 31 is operatively connected so as to drive a square tubed jack column 44 upwardly or downwardly.

In the event of a power failure, provisions are made for manual operation of the jack assembly to enable hooking up to a tow vehicle and retracting the drive wheel for road travel. This is accomplished by removal of the bolts 23 and the bracket 22, thereby disengaging the worm 21 from the worm gear 30, thence the movable jack column 44 may be extended or retracted by turning a suitable hand crank or wrench engaged with a suitably shaped end portion 32 of the shaft 31. A thrust collar 36 is integral with the shaft 31 and is suitably supported by thrust bearings 37, in turn are supported by the thrust cap 38 which is threadedly connected to the stationary jack column 6 and retained thereon by a set screw 39. The shaft 31 is also journaled by a radial bearing 40, which is supported by the thrust cap 38 and the thrust bearing 37. The shaft 31 is threadedly connected to a thrust nut 42 in turn secured to the square tubed jack column 44 as by screws 43. A grease fitting 45 is secured to the end portion 32 of the shaft 31 to lubricate through suitable channels, the bearings 37 and 40 and the thrust nut 42. A stop nut 48 is secured by a pin 49 restricting the downard travel of the thrust nut 42, in the event of a malfunction of a switch S50.

The jack column 44 has mounted, at one side thereof, a pair of actuating lugs 52 and 53 (FIGS. 4 and 4a) positioned to open the respective contacts of the switch S50, by a distance less than full travel of the thrust nut 42, sufficiently, to compensate for motor overrun and to permit the steering means to rotate the jack column 44 without jamming the thrust nut 42 against the thrust collar 36 or the stop nut 48, respectively. The limit switch S50 is stationarily mounted to a steering worm gear 55 and in a position to be actuated by the lugs 52 and 53, regardless of the rotational position of the worm gear 55. A description of this control function will be provided later with reference to the wiring diagram shown in FIG. 5.

Figure 4A:
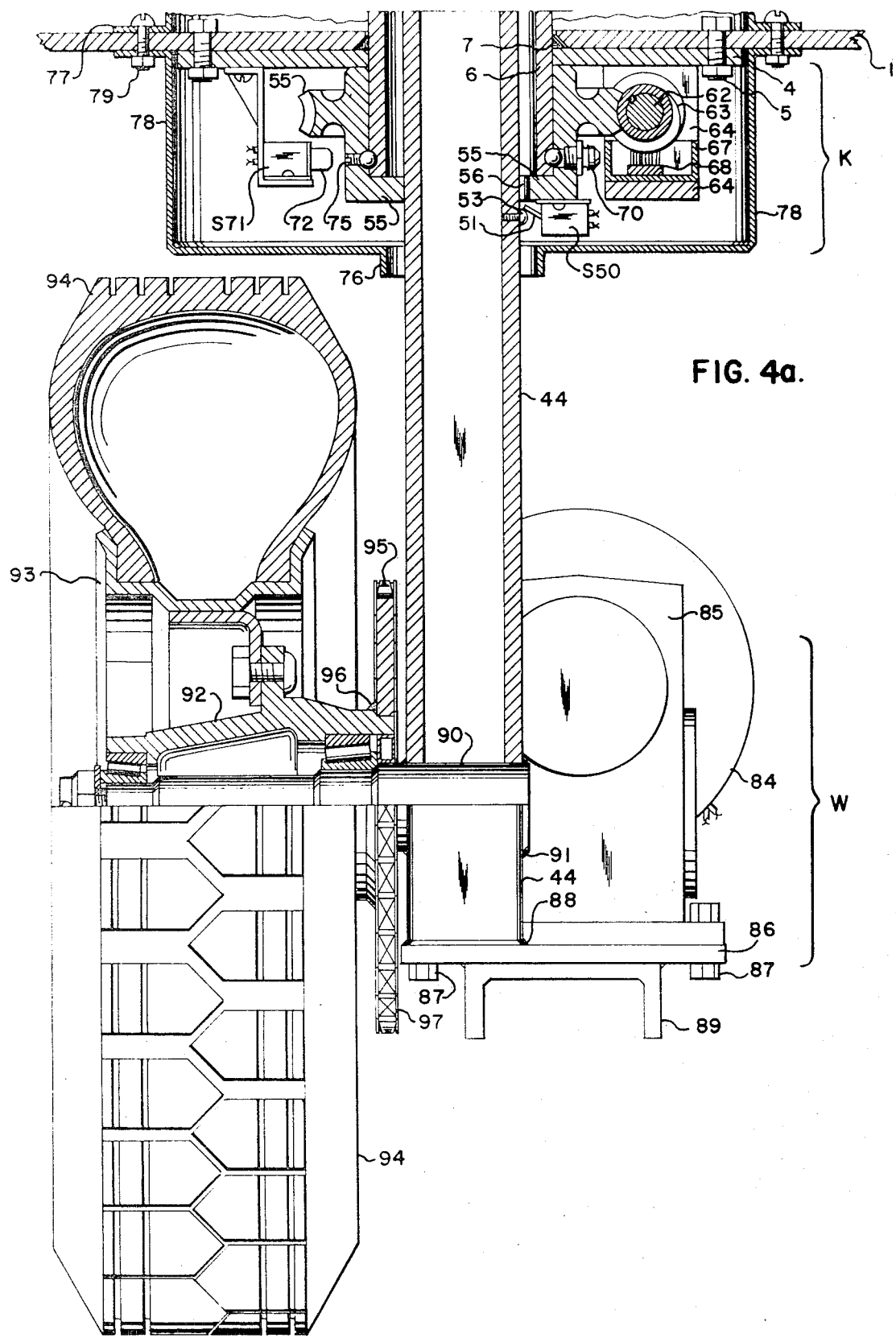

As best seen in FIGS. 3 and 4a, a groove 56 is recessed in the steering worm gear 55 to provide passage for a lug 52 while the jack column 44 is traveling to or from the fully extended position.

STEERING ASSEMBLY

Referring now to the steering assembly K as best seen in FIG. 2, the motor 10, shaft 11 and the drive section 14 of the transmission 12 drives the flexible shaft 60, in turn driving the gear reducer 61 which is secured to the flange 4 as by screws 65. The gear reducer 61 drives a worm shaft 62 which is keyed to a worm 63 (FIG. 4a) and is suitably journaled in bearings supported by a bracket 64, the latter being secured to the flange 4. A lubricant holding pan 67 and a brush 68 are secured within the bracket 64. The worm 63 meshes with the steering worm gear 55 having its hub journaled on bearings supported by the vertical stationary jack column 6. The single ball bearing race functions primarily as a retainer for the gear 55. However, an additional ball bearing race could be placed in the upper hub of the gear 55 if required to further reduce friction. A grease fitting 70 is mounted to the worm gear 55 and has a threefold function in that it retains the ball bearings in the race, provides lubrication access to the bearing surfaces and serves as an actuating lug for a limit switch S71, to be described later. The lower flange of the worm gear 55 is provided with a square aperture (see also FIG. 3) to receive the extendable square tubed jack column 44 thus causing the latter to rotate with the former through a range of approximately 360°, thereby effecting and maintaining positive steering control against any torques created by the drive wheel assembly W as will be described later. A screw 75, in the hub of the worm gear 55, provides access to effect removal of the ball bearings from their respective race. As previously mentioned, the limit switch S71 is stationarily mounted to the flange 4 and in a position to be actuated by the lug 70 as the latter rotates with the worm gear 55 in a direction either to the right or left.

Dirt and moisture covers 77 and 78 are attached to the platform 1 and retained by screws 79. A deflecting flange 76 on the cover 78 minimizes entry of dirt and water thrown from the road by the towing or passing vehicles.

WHEEL DRIVE ASSEMBLY

The wheel drive assembly W as best seen in FIGS. 1 and 4a, includes a motor 84 and gear reducer 85 adjustedly mounted to a platform 86 as by bolts 87 (FIG. 4a). The platform 86 in turn is secured at 88 to the jack column 44. A channel bar 89 reinforces the platform 86 and supports a chain guard (not shown). The jack column 44 further supports a horizontal axle shaft 90 secured at 91. The shaft 90 supports a wheel hub 92 in suitably journaled bearings. The wheel hub 92 supports a wheel rim 93 and in turn supports a tire 94. A chain sprocket 95 is secured at 96 to the wheel hub 92, collectively driven by the chain 97, the latter being driven by a pinion sprocket having its hub keyed to the output shaft (not shown) of the gear reducer 85. The controls to the motor 84 will be described hereafter.

ELECTRICAL CIRCUIT

Referring to the wiring diagram of FIG. 5, the electric power supply for energizing the motors 10 and 84 is supplied by storage batteries 100. Included in the circuit are a manually operable main switch S101, a circuit breaker 102, and three manually operable, normally open, spring-biased double throw switches, i.e., a jack switch S103, a steering switch S104 and a wheel drive switch S105. Relays R107 and R108 are provided to isolate the control circuits from the heavy current power circuits. Also included are the limit switches S50 and S71, which are normally closed and have horizontally directed spring-biased center positioned actuating levers. The electrical system is grounded to the frame 2.

The main switch S101 is locked by key (not shown) to prevent unauthorized use. The jack switch S103 is mounted at any convenient location in the hollows of the channel bar 3, forward of platform 1. Thereupon, by shifting the switch S103 upward a circuit is established through the limit switch S50, the relay R107, the motor 10 and a solenoid actuated clutch in the transmission section 13 for rotation of the latter in the proper direction for motivation of the jack assembly J (FIGS. 2, 4 and 4a). The jack column 44 and the attached drive wheel assembly W will be gradually lowered from the position in which they are shown in FIGS. 1, 4 and 4a until the tire 94 engages with the ground surface, continuing the extension of the jack column 44 will subsequently raise the platform 1, the channel bars 3 and the affixed hitch coupler 16 (FIG. 1). After unlocking the clamp 17, the hitch coupler 16 may be raised clear of the hitch ball 27.

If it is desired to raise the trailer tongue for leveling, it is not necessary to disconnect the trailer from the tow vehicle, but leave the clamp 17 locked and operate the jack assembly until the desired level is obtained.

Referring to FIG. 5, the release of switch S103 will interrupt the circuit thereby maintaining the trailer tongue at any desired height within the jack range. As previously mentioned, the limit switch S50 limits the maximum extension of the jack column 44 by automatically opening the appropriate contact when the vertically actuated lever 51 of the switch S50 is mechanically urged by lug 52 (FIG. 4) stopping further jack extension. By shifting switch S103 downwardly, a circuit is established through the limit switch S50 and the relay R107 thereby reversing the motor 10 and re-energizing the transmission section 13 in a manner previously described. Column 44 will then retract until the switch S103 is released or the lug 53 (as seen in FIG. 4a) urges the lever 51 of the switch S50, thereby automatically opening the appropriate contact, stopping further retraction. With effortless fingertip control, therefore, the raising or lowering of the trailer tongue is easily facilitated.

Steering of the wheel assembly W and driving of the tire 94 is accomplished preferably, and respectively, by the steering switch S104 and the wheel drive switch S105 mounted at the end of an extension cord in a switch box hand-held by the operator. Steering control is effected by shifting the switch S104 so as to establish a circuit through a remote control plug and receptacle 106, the limit switch S71, the relay R107, the motor 10 and a solenoid actuated clutch in transmission section 14, rotating the latter in the proper direction for motivation of the steering assembly K (FIGS. 2 and 4a). As previously mentioned, the extent of right and left steering is limited by the switch S71 which is substantially identical to switch S50, previously described, except the actuating lever 72 is laterally disposed. The actuating lever 72 of switch S71 will automatically open the appropriate contact when mechanically urged by the lug 70, as the latter rotates in the selected direction, thereby stopping further rotation of the jack column 44. Thereupon the shifting of the switch S104 in the opposite upward direction will cause the motor 10 to reverse in an identical manner as previously described, thereby rotating the steering assembly through a range of substantially 360°, until the lug 70 urges the lever 72 from the opposite direction, thus interrupting the circuit. The switch S104 may be jogged to obtain any desired steering angle within the above mentioned range of 360°. For some operators it may be desirable to limit the steering range to 180° in order to automatically stop the drive tire 94 at right angles to the longitudinal axis of the trailer in order to turn the trailer completely around in a minimum turning circle. The above limitation may be accomplished by substituting screw 75 for another lug having similar configurations to lug 70, as previously mentioned. This will be further described later.

The drive wheel assembly is activated by shifting the wheel drive switch S105 in one direction establishing a circuit through the remote control plug and receptacle 106, the relay R108 and the drive wheel motor 84, rotating the latter for movement of the trailer in accordance with the position of the wheel assembly. Shifting of the switch S105 in an opposite direction will cause motor 84 to reverse. A speed control device for the motor 84 could be mounted in the same hand-held switch box containing remote switches S104 and S105. Only one remote control plug and receptacle 106 is shown. However, it may be desirable to mount a receptacle adjacent to the jack and one at the rear of the trailer, or mount one at mid length of the trailer on the sidewalk side with an extension cord of suitable length to permit the operator to control the maneuvering from a remote location at the rear end of the trailer, thus offering an unobstructed view when backing into a parking space or from a location at the front end while maneuvering the trailer tongue and attached hitch coupling 16 for engagement to or disengagement from the hitch ball 27.

FIGS. 6 and 7 illustrate a modified jack column with associated limit switch and a steering means. The components having their counterparts in the first described embodiment of the invention are identified by the same reference numerals and only those features requiring a change of parts are identified by new reference numerals. The principal change is that a jack column 200 is a circular tube and is also rotatably mounted within the stationary jack column 6. A groove 201 is provided in the jack column 200 to receive the land 203 of a steering spur gear 204. The land 203 will rotate the jack column 200 in the same manner as previously described for the extendable jack column 44. The spur gear 204 meshes with a spur pinion 205, the latter being suitably journaled in bearings supported by a cover 206 in turn secured as by screws 207 to the platform 1. This alternate steering means is adaptable to other drive sources that would provide a positive steering control against the torque produced by the drive wheel as previously mentioned in the first embodiment of the invention.

The extension and retraction range of the jack column 200 is controlled by a limit switch S208 having a laterally directed spring-urged cam follower 209 which is adapted to ride within the vertical groove 201 maintaining normally closed switch contacts until the actuating follower 209 seats within the upper detent 211 automatically opening the appropriate contact and stopping further jack extension. When the jack column 200 is being fully retracted, the cam follower 209 will become depressed by the lower incline 212 automatically opening the appropriate contact and stopping further jack retraction. The function of the switch S208 and its connections in the circuit is identical to that previously described for the switch S50. A round-headed screw 202 (FIG. 7) has been substituted for the screw 75 (FIG. 4a), thus functioning as an additional actuating lug, diametrically opposed to the lug 70, thereby automatically limiting the steering range to 180° as previously described.

It will now be understood that the modification illustrated in FIGS. 6 and 7, particularly the extendable rotatably mounted jack column 200, the limit switch S208 and the steering worm 55 (mutally modified to engage the groove 201) provide another means to effect steering and jack control, which are readily adaptable to the first embodiment of the present invention.

The modification illustrated in FIG. 8 is a drive means comprising a gear reducer 214 whose splined output shaft 215 drives a splined drive shaft 126 which in turn drives a splined hub plate 217 which is secured to a wheel hub 218 as by screws 219. The hub 218 is suitably journaled in bearings supported by hollow axle shaft 220 which is secured to an angle plate 221 which in turn is secured to the jack column 44. A centering sleeve 222 is secured to the jack column 44 and the angle plate 221 to facilitate alignment of the axle shaft 220 and reinforces column 44. Shaft seals 224 and 225 exclude dirt and moisture from the wheel bearings. The modification illustrated provides another driving means and reduces the horizontal turning circle of the motor 84. The reduced turning circle permits the platform 1 to be secured closer to the tongue apex while providing sufficient rotational clearance between the motor 84 and the channel bars 3 when the drive wheel assembly is fully retracted.

Although two exemplary embodiments and modifications of the invention have been disclosed herein for purposes of illustration, it will be understood that various other changes, modifications and substitutions may be incorporated without departing from the spirit of the invention as defined by the claims which follow.

I claim as my invention:

1. In a maneuvering device mounted to the tongue bar of a trailer or the like, a combination of:
   a. a movable jack column supported by said bar and adapted to be rotated and vertically translated with respect to said bar;
   b. a ground-engaging wheel mounted to the lower end of said jack column;
   c. a first driven means operatively connected to said column for translating the same;
   d. a second driven means operatively connected to said column for rotating the same;
   e. drive means;
   f. a transmission having an imput connected to said drive means and an output connected, restively, to each of said driven means;
   g. control means interconnecting said drive means and said transmission for selectively and reversibly driving each of said driven means;
   h. a platform connected to said bar and elevated therefrom to provide room for said wheel to be retracted.

2. In a maneuvering device mounted to the tongue bar of a trailer or the like, a combination of:
   a. a movable jack column supported by said bar and adapted to be rotated and vertically translated with respect to said bar;
   b. a ground-engaging wheel mounted to the lower end of said jack column;
   c. a first driven means operatively connected to said column for translating the same;
   d. a second driven means operatively connected to said column for rotating the same;
   e. drive means;
   f. a transmission having an imput connected to said drive means and an output connected, respectively, to each of said driven means;
   g. control means interconnecting said drive means and said transmission for selectively and reversibly driving each of said driven means;
   h. a second jack column connected to said bar positioned stationary relative to said movable jack column, said stationary column being tubular and having a generally circular cross sectional geometry wherein said movable column is tubular having a generally square cross sectional geometry, said movable column being disposed within the interior of said stationary column.

3. A device as claimed in claim 2 including:
a pair of lugs connected to said movable column and movable therewith;
a first switch mounted to operatively engage said lugs whereby translational movement of said movable column may be limited;
another lug mounted to said second driven means;
a second switch mounted to operatively engage said other lug whereby rotational movement of said movable column may be limited;
a platform connected to said bar and elevated therefrom to provide room for said wheel to be retracted; and
wherein said second driven means includes a gear having a central square shaped aperature to receive said movable column.

4. A device as claimed in claim 2 wherein said second driven means includes a gear having a central square shaped aperture to receive said movable column.

* * * * *

PO-1050
(5/69)

UNITED STATES PATENT OFFICE
CERTIFICATE OF CORRECTION

Patent No. 3,783,960    Dated  January 8, 1974

Inventor(s)  Jack M. Feliz

It is certified that error appears in the above-identified patent and that said Letters Patent are hereby corrected as shown below:

Column 7, line 1, "126" should be --216--;

Signed and sealed this 17th day of September 1974.

(SEAL)
Attest:

McCOY M. GIBSON JR.
Attesting Officer

C. MARSHALL DANN
Commissioner of Patents